Figure 1:
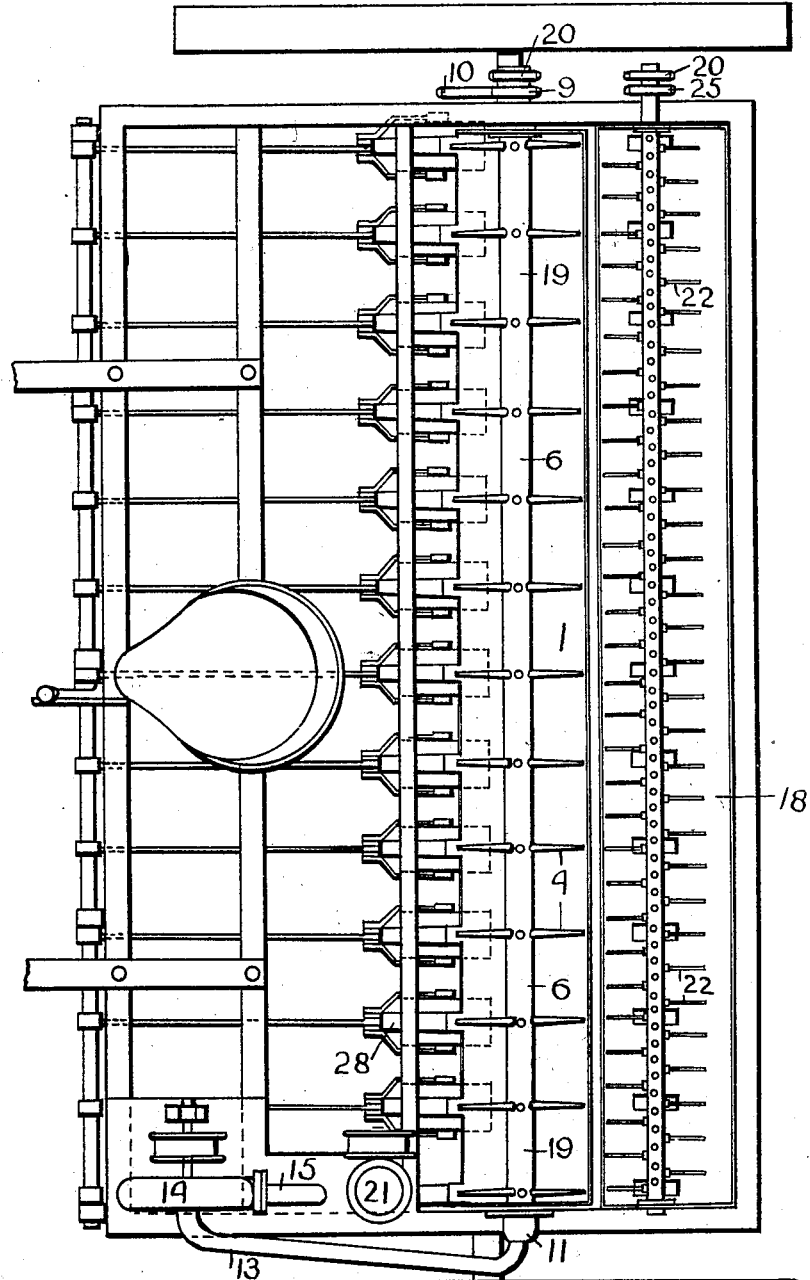

No. 773,205. PATENTED OCT. 25, 1904.
G. W. GREEN.
SEED PLANTING MACHINE.
APPLICATION FILED APR. 19, 1904.
NO MODEL. 5 SHEETS—SHEET 1.

WITNESSES
INVENTOR
George William Green

No. 773,205. PATENTED OCT. 25, 1904.
G. W. GREEN.
SEED PLANTING MACHINE.
APPLICATION FILED APR. 19, 1904.
NO MODEL. 5 SHEETS—SHEET 3.
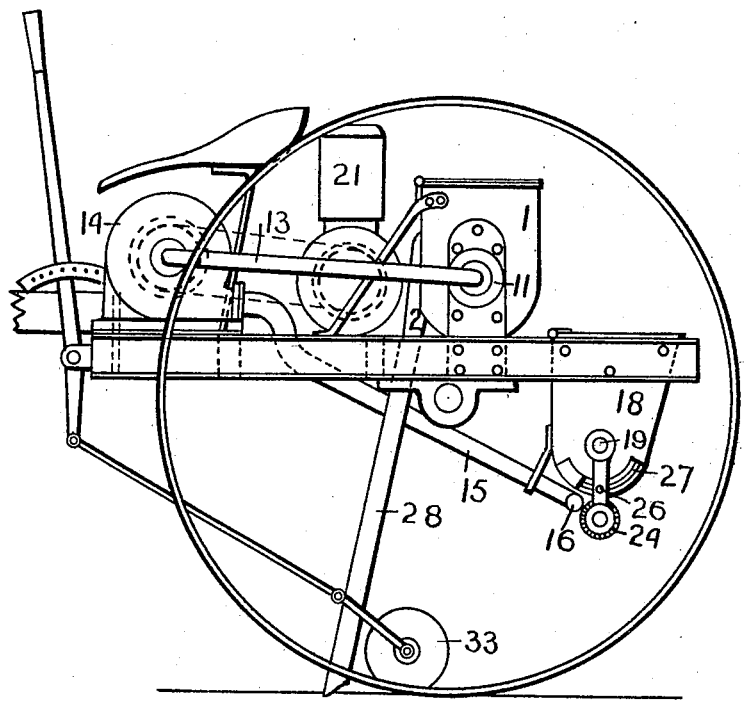
FIG. 3
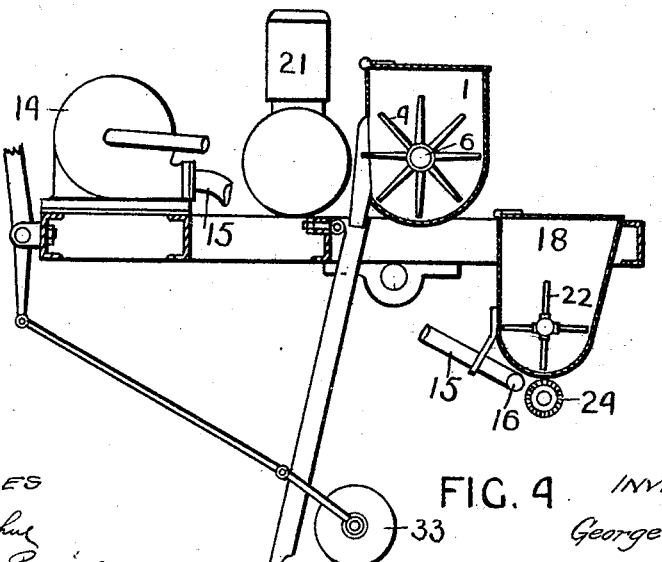
FIG. 4
WITNESSES
INVENTOR
George William Green
ATTORNEYS No. 773,205. PATENTED OCT. 25, 1904.
G. W. GREEN.
SEED PLANTING MACHINE.
APPLICATION FILED APR. 19, 1904.
NO MODEL. 5 SHEETS—SHEET 4.
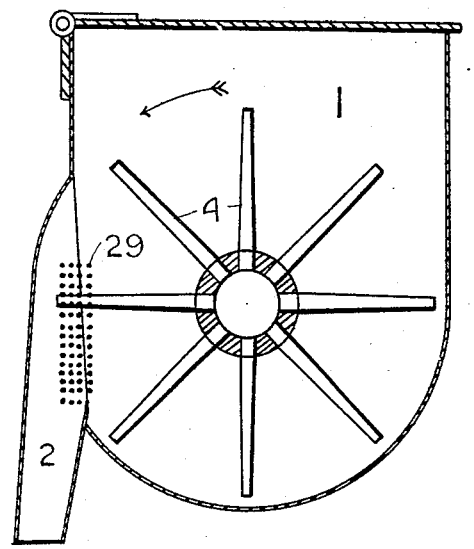
FIG. 5
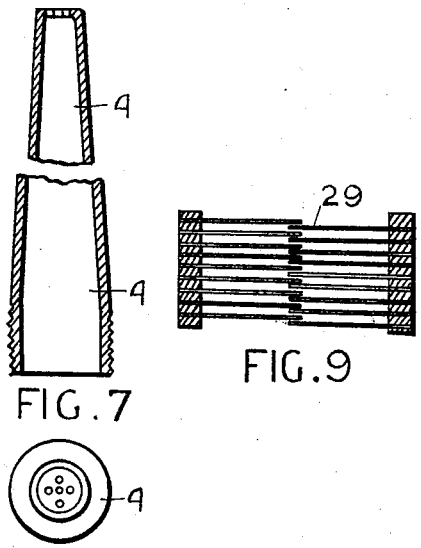
FIG. 7
FIG. 9
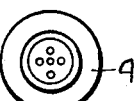
FIG. 8
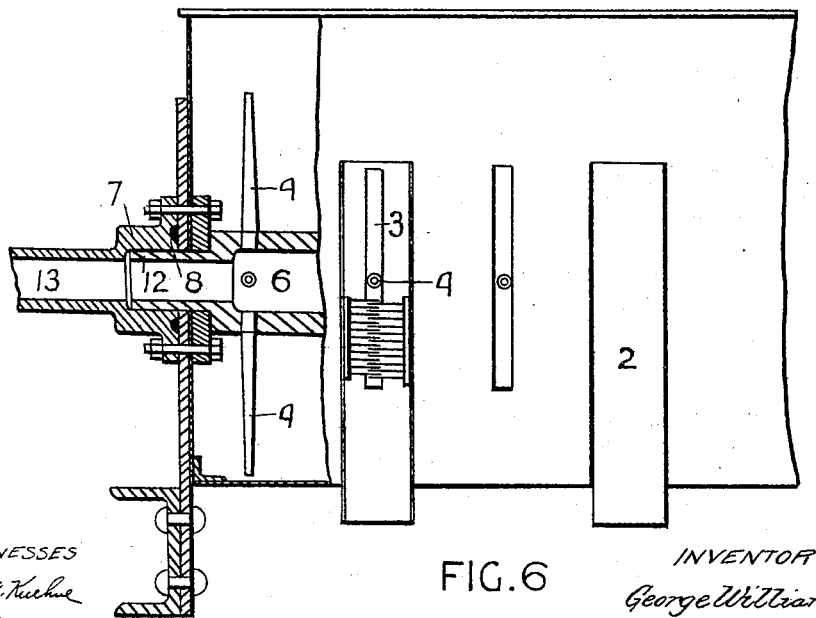
FIG. 6
WITNESSES
INVENTOR
George William Green
BY
ATTORNEYS No. 773,205. PATENTED OCT. 25, 1904.
G. W. GREEN.
SEED PLANTING MACHINE.
APPLICATION FILED APR. 19, 1904.
NO MODEL. 5 SHEETS—SHEET 5.

WITNESSES
INVENTOR
George William Green

No. 773,205. Patented October 25, 1904.

UNITED STATES PATENT OFFICE.

GEORGE WILLIAM GREEN, OF WOY WOY, NEW SOUTH WALES, AUSTRALIA.

SEED-PLANTING MACHINE.

SPECIFICATION forming part of Letters Patent No. 773,205, dated October 25, 1904.

Application filed April 19, 1904. Serial No. 203,897. (No model.)

*To all whom it may concern:*

Be it known that I, GEORGE WILLIAM GREEN, carpenter, a subject of the King of Great Britain and Ireland, residing at Woy Woy, Hawkesbury River, in the State of New South Wales, Australia, have invented new and useful Improvements in Seed-Planting Machines, of which the following is a specification.
My invention relates to machines for planting grain and seeds, and includes mechanism for distributing manure with the same.

It has for its object to effect an economy in the expenditure of seed by the provision of means for picking up and dropping only precisely the number of seeds required to obtain a hill; and in relation to the manure-distributer it has for its object the more efficient distribution of the manure by the coöperation with the distributing appliance of certain of the means used for effecting the planting of seeds.

My said invention consists in a machine in which the principle of using an exhaust for picking up small articles in a cupule or suction-cup is availed of in combination with a device for liberating the seeds and directing the same into the chutes which convey them to the furrows.
In carrying out my invention I provide a trough running crosswise of the machine, and I set up therein a hollow barrel connected with an exhaust-fan which is operated by an independent motor or by gearing from the wheels of the machine, and I mount on this hollow barrel picker-arms whose bore and cupule-mouths are adapted for the handling of the particular seeds on which the machine is required to work. One or more of these picker-arms is provided to coöperate with each chute, and the relation of the picker-arms and their barrel to the trough is such that they pass beyond one side of the trough, which is slotted to allow them to do so. A brush-wiper is provided at the slot to remove or flick off the seed carried round on the cupule before the picker-arm reënters the seedbox. The exhaust-air from the fan is carried by a trunk and used as a jet to spray the manure as the same passes out of the manure-trough at the rear of the machine through the grating-bottom or gates of the same. This grating-bottom or gate-slot is adjustable as to size, and rotating mechanism is fitted within the trough for agitating and breaking up the manure when the same is not in a powdered shape when loaded into the machine.

Figure 2:
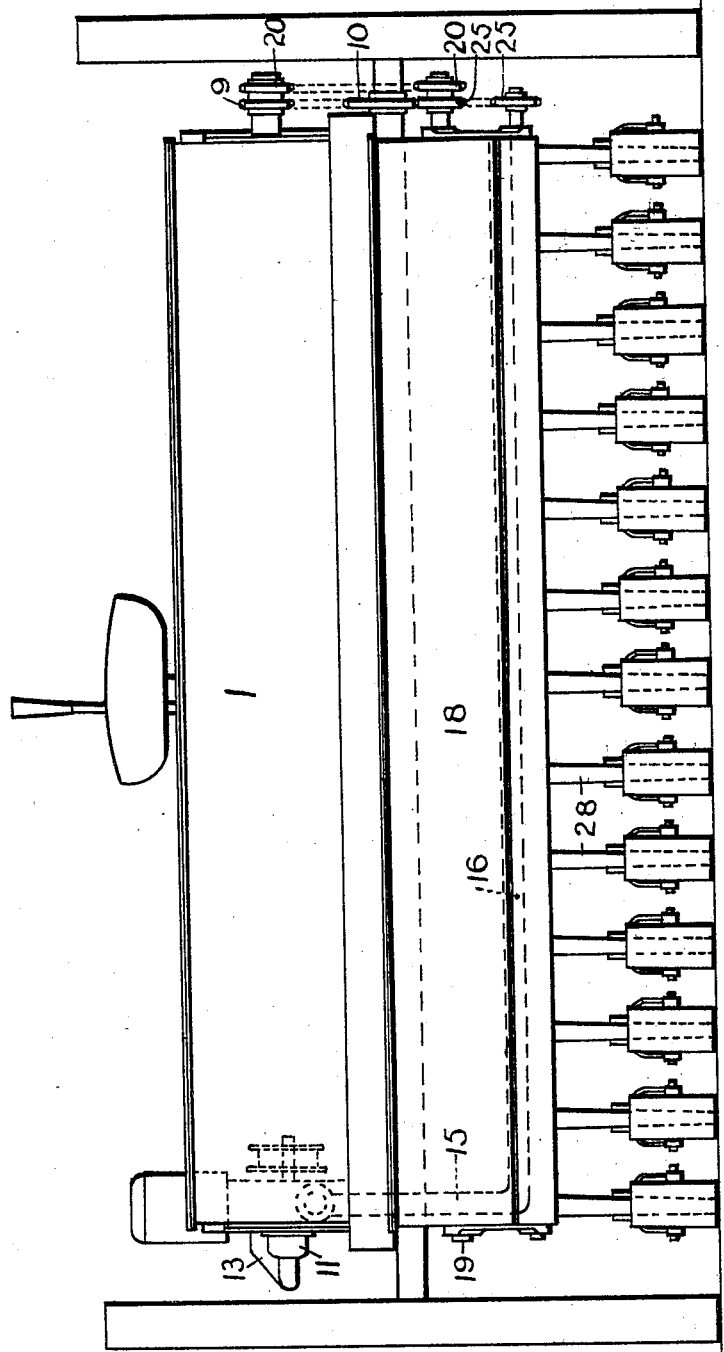
Figure 10:
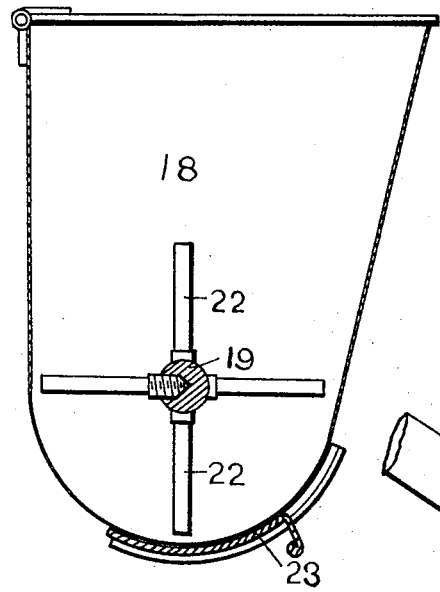
Figure 11:
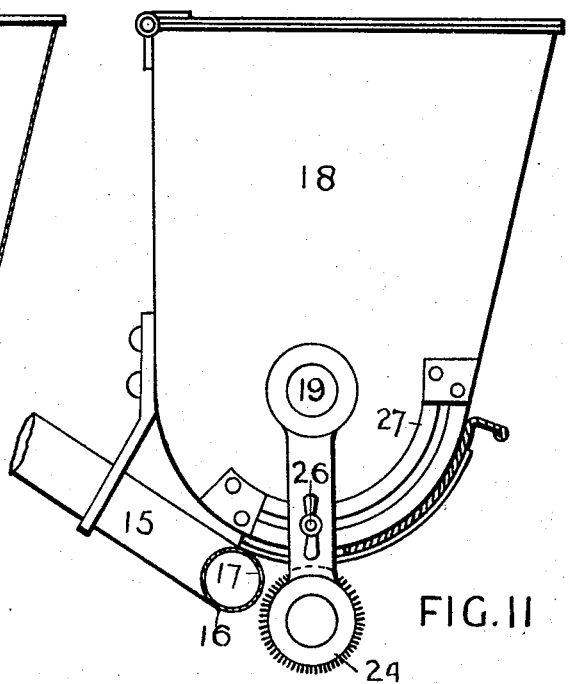

In the annexed drawings, Figure 1 is a top plan of a machine constructed according to my invention with the covers of the seed and manure troughs lifted off. Sufficient detail only is shown to explain the operation. Fig. 2 is a back view of the machine. Fig. 3 is a side elevation omitting unnecessary details; Fig. 4, a longitudinal section through the operative parts, showing the exhaust-fan and motor in elevation; Fig. 5, an enlarged cross-section through seed-trough intended to explain the operation of the cupule seed-lifter; Fig. 6, a front sectional elevation of fragment of seed-trough, illustrating detail of barrel-mounting and flicker-brush; Fig. 7, an enlarged section through one of the cupule-arms; Fig. 8, a top plan of the mouth of same. Fig. 9 is an enlarged view showing the arrangement of the bristles, which may be of wire or fiber, in the flicker-brush; Fig. 10, a cross-section through manure-trough; Fig. 11, a sectional end elevation explanatory of the regulating-gate and the pneumatic and mechanical distributing mechanism, and Fig. 12 a side elevation of a modification of the apparatus adapted to deliver the manure into the furrows.

The front end of the seed-trough 1 is slotted through to form an entry for each of the seed-chutes 2, which are arranged to carry the seed to the furrows. The mechanical arrangements indicated in the drawings relating to the construction and mounting of these chutes with their following roller forms no part of the invention, the same being capable of application to any type of seed-planting machine in which the seed is carried to the furrow by a chute, tube, or funnel.

At the sides of the slot 3 in the seed-chamber 1 wire or bristle brushes are set with the points facing and just overlapping, as shown in Fig. 9. These brushes form a portion of the side of the trough, and the seed may be heaped up against them. The brushes are so fixed in relation to the position of the cupule-arms 4 that the points of the same pass beyond them, as indicated in Fig. 5, and must pass through them to reënter the body of seed in the trough. The direction of rotation of the picker-arms is indicated by the arrow in that figure.

The barrel 6 is a plain tube of sufficiently stout dimensions to carry its weight without sagging. It is bored and tapped at positions corresponding with the slots 3 to receive one or more cupule-arms 4, and at the ends it is carried in any suitable form of housing which will permit of its rotation while keeping a fairly tight air-joint at the journal. As shown in Fig. 6, the end of the barrel is turned down slightly and carried into a housing 7, in which a packing-ring 8 is inserted to make the air-joint. At the other end the barrel is closed and a sprocket-wheel 9 fitted thereto to convey to it the necessary rotary motion from gearing 10 on the wheel or axle of the machine. The tip of the cupule may be a plain hole when smooth spherical seeds are to be handled. Where large irregular-shaped seeds are being dealt with, it will be necessary to use rubber fittings on the ends of the arms, so as to obtain a flexible support for the seed, which would otherwise touch insufficiently to be attracted and held by the air-suction. In the case of small seeds generally the mouth of the cupule is made a little larger than the seeds and pierced with several very fine holes, as indicated in Fig. 8. In practice a better holding effect is obtained in that way, one or other of the suction-holes, as it were, laying hold of the seed; but the whole cupule-surface should not be substantially larger than the seed on which it is required to operate.

The pipe 11, in which the journal 12 for the open end of the barrel 6 is provided, is connected by suitable piping 13 to an exhaust-fan 14, which may be of the ordinary centrifugal type, working at high speed. This fan is driven by a motor or by gearing from the wheel or axle of the machine. In the drawings a motor such as the ordinary type of oil-motor is indicated. The exhaust from the fan is carried by a pipe-line 15 to a distributing-pipe 16 with nozzle-holes 17 drilled therein, one directly in front of each distributing-slot in the bottom of the manure-trough 18. In the manure-trough is mounted a shaft 19, which is also driven by gearing 20 from the wheel or axle of the machine, or may be connected to the motor 21 by a chain belt. This shaft carries beater-arms 22, which keep the manure agitated, thereby assuring the breaking up of any lumps which may have formed therein and assuring also the regular feed of the same through the slots at the bottom of the box. These slots may be opened up to the necessary degree by a sliding plate 23, fitted thereto so as to allow a greater or less quantity of manure to pass through them, as may be required. The openings are kept free by the action of a revolving brush 24, which is hung from the main shaft 19, carrying the beaters 22, and is operated by chain gearing 25 therefrom. This brush 24 may be set up at any desired position by fastening the bolt 26 on the quadrant-plate 27.

It will be necessary to vary the picking-arms 4 to suit certain varieties of seeds to be handled. Thus the smallest-sized nozzle is adapted to pick up parsnip, turnip, and carrot, while the medium will pick up any cereal. The largest size is adapted to pick up beans, peas, and corn. The rubber nipple is required only in the latter case. The nozzles are made to screw into the barrel, so that they may be readily inserted and withdrawn. A maximum number of holes for carrying picking-tubes are made in the barrel; but if any lesser number of tubes are required the spare holes are filled with plugs.

The mode of operation is as follows: The machine being drawn along by horses in the usual way, the motor 21 is set in motion and the fan 14 is rotated, so as to create a partial vacuum in the piping 13 and barrel 6. The movement of the machine is communicated to the barrel 6 by gearing 9 and effects the rotation of that barrel in the direction shown by the arrow in Fig. 5. As the cupules or picking-arms 4 pass through the mass of seed lying in the bottom of the seedbox 1 they each pick up in the cupule-point one seed and hold the same firmly while they carry it round over the chutes 2, leading to the downtake-tubes 28. As the cupules rub through the brushes 29, passing between the bristles, the seed is flicked off and dropped into the chutes 2. Each one of the picking-arms 4 carries a seed round in this way and the seed is flicked off the cupule which carries it as the picking-arm passes through the brushes 29. The number of arms used to each chute depends upon the number of seeds required to be dropped into each chute at each revolution of the barrel 6, and the machine is set up to operate on different seeds by screwing in picking-arms with cupules adapted to the seeds to be dealt with. The partial vacuum within the barrel, which extends also through the bore of the picking-arms, acts as the carrying force and retains the seeds in the cupule-points by reason of external atmospheric pressure acting thereon until they are flicked off by the brush. The air discharged from the fan passes by the pipe 15 to the distributing-pipe 16, whence it escapes in fine streams through the holes 17 and is projected against the manure which is falling through the slotted bottom of the manure-trough 18. At the same time the rotation of the clearing-brush 24 keeps the trough-gates free and insures a steady and ready fall of manure, while the beaters 22, within the manure-trough, keep the same agitated and broken up and maintain a regular supply of the same. The manure is thus distributed broadcast over the ground in which the seeds have been sown by the preceding portion of the machine.

Figure 12:
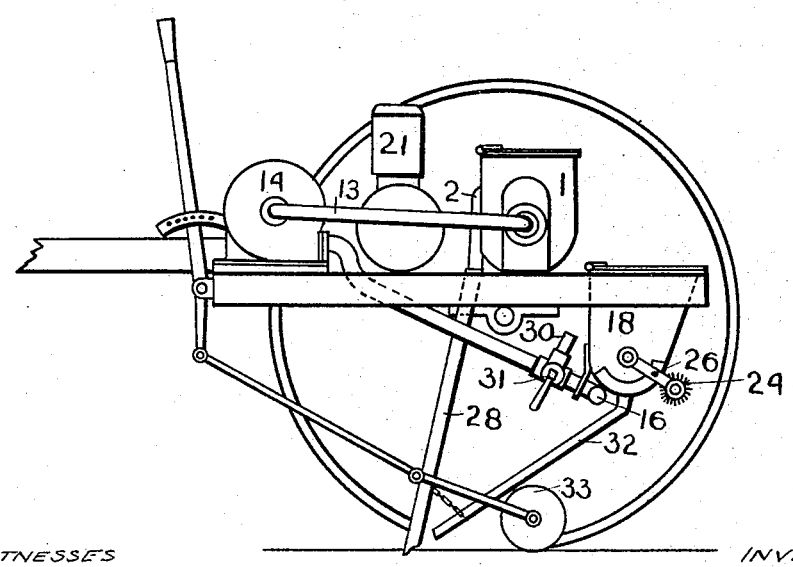

Alternative apparatus for depositing the manure in the furrows along with the seeds and not broadcast, as before described, is illustrated in Fig. 12 of the drawings. In this modification the air-exhaust pipe 15 is either dispensed with or it is fitted with an air-outlet 30, in which latter case a controlling two-way cock 31 placed at the junction allows the air to be shut off from the distributing-holes 17 in pipe 16 and exhausted through the pipe 30. The brush 24 is swung clear of the slotted bottom of the manure-trough and is fastened in position by the bolt 26. Distributing-pipes 32, feeding the manure from the trough 18 to the furrows and immediately in front of the furrow-closing rollers, are secured to the bottom of the trough 18 and to the lower end of the downtake-tubes 28, thus allowing the manure to run into the furrows immediately in front of the closing-rollers 33. In this modification the closing-rollers 33 are set well in rear of downtake-tubes, so as to provide clearance for the manure-distributing pipes 32.

What I claim as my invention, and desire to secure by Letters Patent, is—

1. In a seed-planting machine, means for lifting seed from the seed-trough consisting of moving picker-arms with cupule-points through which a current of air is drawn inward by suction, and means for flicking the seeds from the cupule-carriers before same return to the seed-trough and dropping said seed into seed-chutes leading to the furrows.

2. In seed-planting machines, the combination of a seedbox, a rotating barrel, picker-arms having cupule-points carried thereby, means for exhausing air from said arms, means for rotating said barrel for causing the arms to pass through the seed in the seedbox whereby the arms will pick up grains of seed in the cupule-points by atmospheric pressure, and a brush through which the arms pass after leaving the seedbox adapted to flick off the seed from said arms.

3. In seed-planting machines, the combination with a seedbox of a rotating barrel 6 internally connected to an air-exhausting apparatus, picker-tubes 4 with cupule-points mounted on said barrel and carried round thereby in its rotation, and a duplex brush 29 in the upper part of the seed-chute and forming portion of the side of the seedbox, substantially as described.

4. In a seed-planting machine, the combination with a seedbox and seed-chute leading into the side thereof, of a duplex brush adapted to flick off seeds from cupule-carriers on revolving picker-arms which move through the seed-chamber and rub through the said brush, picking up seed in passing through the chamber and dropping same from the brush to fall into the seed-chute therefrom, substantially as described.

5. The combination with a seed-planter, of moving picker-arms, means for exhausting the air from said arms, a manure-distributer and means for conveying the exhausted air from the arms into and through the manure as it falls from the distributer.

6. A seed-planter comprising picker-arms, a fan having an exhaust-pipe connected to said arms, a manure-distributer and a pipe leading from said fan to the distributer for conveying the air-exhaust from said arms under pressure into and through the manure falling from the distributer.

7. The combination with a seed-planter, of moving picker-arms, a manure-distributer pipe connections from said arms to the distributer and a fan intermediate of the connections.

In testimony whereof I have hereunto set my hand in presence of two subscribing witnesses.

GEORGE WILLIAM GREEN.

Witnesses:
C. M. HEPBURN,
W. J. DAVIS.